Sept. 13, 1960     L. N. PHILLIPS     2,952,040
MOULDING OF SYNTHETIC RESINOUS MATERIALS
Filed Nov. 10, 1953
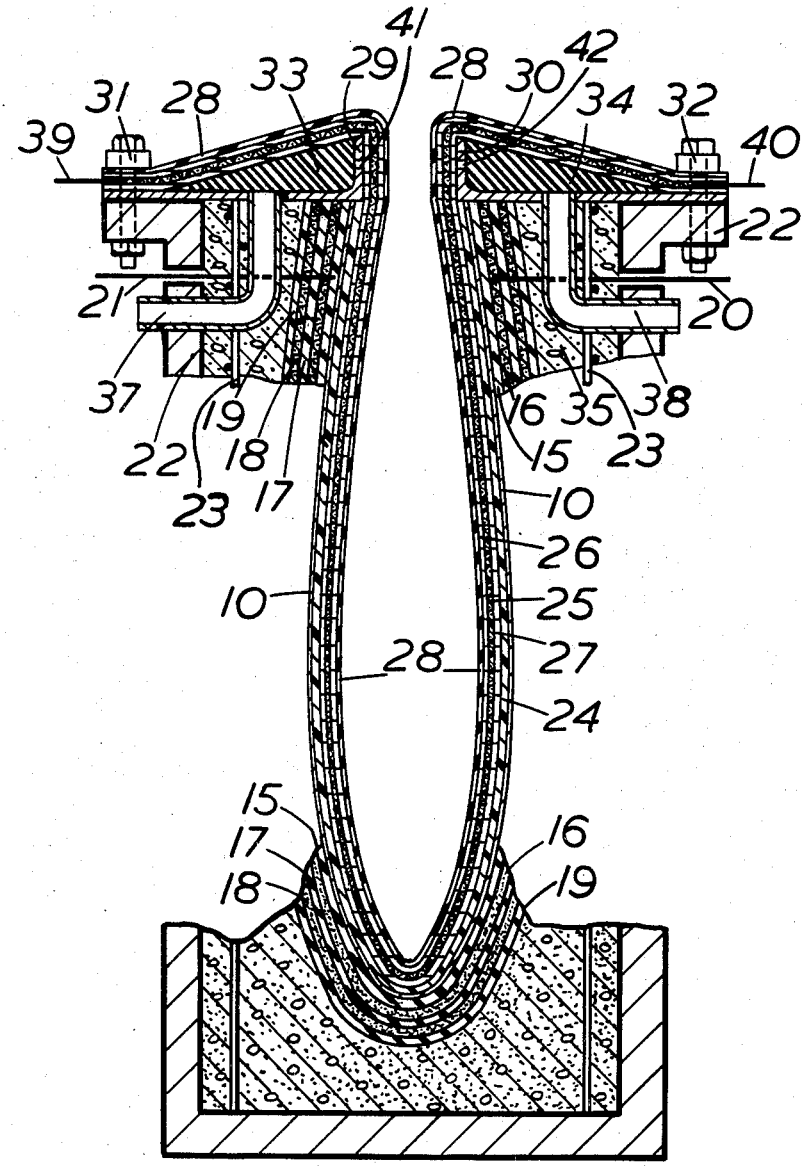
Inventor
LESLIE NATHAN PHILLIPS,
By
Robert B Pearson
Attorney

United States Patent Office 2,952,040
Patented Sept. 13, 1960

---

2,952,040

MOULDING OF SYNTHETIC RESINOUS MATERIALS

Leslie Nathan Phillips, Farnborough, England, assignor to National Research Development Corporation, London, England, a British corporation Filed Nov. 10, 1953, Ser. No. 391,212

Claims priority, application Great Britain Nov. 15, 1952

10 Claims. (Cl. 18—55)

This invention relates to the production of heat convertible synthetic resinous products and the manufacture of reinforced products comprising a fibrous or like felted or woven component and an impregnant of cured synthetic resin.

In the manufacture of such cured products it is desirable to reduce either the temperature or the time, or both, of the curing operation necessary for commonly employed resins such as phenol formaldehyde and other phenolic resins made from monohydric phenols, especially in the manufacture of large structures.

It is to be noted that no appreciable cure of a simple heat convertible monohydric phenol aldehyde resin, such as phenol formaldehyde resin, takes place below 100° C. and, in practice, cure is carried out at temperature of the order of 150°–160° C. Each reduction in temperature of 10° C. doubles the cure time.

In theory it is possible to reduce the curing temperature and time, or both, of such resins by the addition thereto of a polyhydroxy phenol, such as resorcinol, or a polyhydroxy phenol aldehyde resin (for example resorcinol formaldehyde resin), or by using strong catalysts. However, where resorcinol-formaldehyde resins (typical in general of polyhydroxy phenol aldehyde resins), are used to accelerate the cure of heat convertible phenol formaldehyde resins (typical in general of monohydric phenol aldehyde resins) the conventional phenol formaldehyde and resorcinol formaldehyde resins as commercially available each contain and are modified by what has hitherto been thought to be an essential proportion of a cure accelerator and resin hardener such as paraformaldehyde. A resorcinol formaldehyde resin thus modified is unstable and will cure to the "gel" stage in from 3 to 6 hours, furthermore, when mixed with the phenol formaldehyde resin it makes the mixed resin equally unstable at room temperature and liable to cure to the "gel" stage in an inconveniently short time, depending on the proportions of the resorcinol formaldehyde and phenol formaldehyde in the mixture. The advantages of mixing the resins to improve the cure of the monohydric phenol aldehyde resin are thus considerably reduced.

In practice, therefore, because the shelf life of a felt or other reinforcement impregnated with a simple monohydric phenol aldehyde resin and additionally impregnated with a polyhydroxy phenol aldehyde resin or additionally catalysed is inconveniently shorter than that of a reinforcement impregnated with the phenol aldehyde resin alone, relatively little use has been made hitherto of such additional impregnants or catalysts, especially in cases where the expenditure of considerable time has been unavoidable, e.g. in the case of large or complex mouldings where assembly operations necessarily take a long time, say up to 24 hours.

The present invention, in its broadest aspect, is a heat convertible synthetic resin mixture stable at room temperature comprising at least a monohydric phenol aldehyde resin and a polyhydroxy phenol aldehyde resin, the latter resin being itself substantially stable at room temperature and the former resin having an unreacted aldehyde content insufficient for any resulting activation of the polyhydroxy phenol aldehyde resin to cause substantial curing of the mixture at room temperature.

The presence of the polyhydroxy phenol aldehyde resin ensures that when the mixture is heated to a curing temperature above room temperature that curing will take place faster and at a lower temperature than in the case of a monhydric phenol aldehyde resin.

Further because of stable nature of the mixture at room temperature, the carrying out of operations such as the impregnation of fibrous or like felted or woven components with the mixture or its constituents separately and the laying up of such impregnated components in moulds for moulding is facilitated, the impregnant resin mixture remaining capable of being heat cured faster and at a lower temperature than the monohydric phenol aldehyde resin itself.

Advantageously the stable polyhydroxy phenol aldehyde resin is added to the monohydric phenol aldehyde resin in solution in a non-reactive volatile solvent which is capable of being readily removed subsequently from the mixture. The solvent may, for example, be removed during the cure process when the temperature is raised to the required value but otherwise may remain in solution and so assist in maintaining fluidity and, to some extent the stability at room temperature of the resin mixture.

It is desirable to make the polyhydroxy phenol aldehyde resin stable by simply making it deficient in formaldehyde. Such a resin in the unstable form, i.e. comprising an amount of formaldehyde sufficient normally to cause cure, may be stabilised to the limited extent of prolonging the cure time by changing its pH value; this process however is not normally practicable, especially in dealing with very large built up structures comprising, for example, many layers of fibrous resin impregnated material.

In another aspect, the invention relates to the manufacture of built up reinforced synthetic resinous products in which it will generally be convenient to impregnate a fibrous or like felt or woven resin-absorbent component first with the monohydric aldehyde resin for example, phenol formaldehyde (which is for practical purposes stable at room temperature and even to a large extent up to 100° C.), then at a convenient later stage of manufacture to further impregnate the reinforcement with the solution of the stable polyhydroxy phenol aldehyde resin (for example, a resorcinol formaldehyde resin) in the non-reactive solvent (for example acetone) and then to proceed with the curing process of which the time and temperature will depend on the proportions of the monohydric phenol aldehyde resin and the polyhydroxy phenol aldehyde resin in the mixture.

Asbestos felts impregnated with water soluble phenol formaldehyde resins, such as those marketed under the Registered Trade Name "Durestos" are readily available commercially and suitable for use as fibrous components according to this aspect of the invention.

The impregnation of the reinforcements with the polyhydroxy phenol aldehyde resin may be carried out by spraying, brushing or dipping as the case may be.

In a development of the invention, it may be desirable to make products according to the aforementioned other aspect of the invention by a novel technique which may be termed "vacuum moulding" whereby reinforcements impregnated with thermo setting synthetic resinous materials are pressed against a mould surface by the differential pressure acting upon the side of a sheet of material non-permeable to air as the result of the exhaustion of air and other gases from a sealed space formed between the mould surface and the other side of the nonpermeable material, a layer of porous material being interposed between the non-permeable material and the material to be moulded to facilitate the exhaustion.

In the application of the invention to this process the proportion of the meta-hydroxy phenol may be relatively high because this process permits the efficient extraction of gases evolved during the cure and prevents malformation, such as blistering, of the finished product which would otherwise be caused by the gases generated within the material during the cure.

Regarding the nature of a phenol formaldehyde resin as may be employed in carrying out the invention it is desirable to use thermosetting resins made from mixtures of phenol and aldehyde in proportions by molecular weight in the ratio 1:1 to 1:1.5, although it is well known to make such resins from proportions of the reactants in the range 1:1 to 1:2.5. The mixtures are heated under reflux to effect condensation with approximately 1% of caustic soda as a catalyst of the weight of the phenol. The time and temperature of reflux may be varied but, in general, as the reaction time increases the water solubility of the resin decreases. Thus using phenol and formaldehyde in the ratio 1:5.5 a reaction time of approximately 40 minutes will give a product soluble in its own volume of water but with a reaction time of 90 minutes the product will be soluble in alcohol.

Regarding a resorcinol-formaldehyde resin as may be employed in carrying out the invention, it is desirable to use a resin comprising resorcinol and formaldehyde in proportions by molecular weight in the range 1:0.5 to 1:0.8. It is made by applying heat to a mixture of the reactants to begin the resin forming reaction which is extremely exothermic and, once begun, may require controlling by cooling. An excess of formaldehyde will result in an unstable resorcinol formaldehyde resin.

Five examples of the invention will now be described, Example V being the manufacture of a built-up aerofoil skin by vacuum moulding.

Figure 1 illustrates the aerofoil of Example V and is a diagrammatic drawing which represents an elevational section through a mould with the moulding of a skin for an aerofoil in progress, parts of the mould being broken away for clarity of illustration.

In each example, the basic materials used are asbestos fibre felts impregnated with a phenol formaldehyde resin which is soluble in acetone, the resin content of the impregnated reinforcement being approximately 50% by weight.

Example I

A number of felts impregnated with a resin mixture as above defined were further impregnated with a solution of 70 parts by volume of a stable resorcinol formaldehyde resin syrup (deficient in formaldehyde) and 30 parts by volume of acetone, the impregnation being carried out by brushing the solution on to the felts which were subsequently laid up in stack. The stack (see a in the following table) was then cured by the vacuum moulding technique. That is by placing it in a rubber bag, evacuating the bag to a vacuum of 25 inches of mercury, placing the evacuated bag in an oven and heating it to cure the resin at a temperature of 110° C. for 2 hours whilst maintaining the vacuum.

For the purpose of comparison two similar stacks of felts were prepared (see b and c in the following table) the stack b being cured under the same conditions as the stack a and the stack c by conventional technique for ½ hour at 160° C., in addition to the time needed to reach this temperature for the cure to be complete. It is to be noted that in the case of c full cure at 110° C. would require 16 hours and at 100° C. up to 36 hours.

The following physical properties were obtained.

|  | Modulus of elasticity, p.s.i. | Ultimate tensile strength, p.s.i. |
| --- | --- | --- |
| a. Material A according to the invention | 2.59×10⁶ | 18,000 |
| b. Conventional material B | 1.88 | 14,000 |
| c. Conventional material C | 2.40 | 19,000 |

Example II

Eight pieces of commercial resin impregnated asbestos felt impregnated with a water soluble phenol-formaldehyde resin, the resin content being approximately 50% by weight, were subsequently brush coated on both sides with a mixture consisting of 9 parts by weight of a stable liquid resorcinol-formaldehyde resin and 1 part by weight of acetone.

The original weight of the felts after impregnation with the phenol-formaldehyde resin was 80 grams per square foot and the final weight after the coating with resorcinol-formaldehyde solution and allowing the added solvent to evaporate was 120 grams per square foot. The solvent was allowed a minimum of 10 minutes evaporation time. It was found that the felt with the added resorcinol-formaldehyde coating was quite stable and gave excellent cured products even when curing took place 7 days after coating.

To effect curing, the felts were assembled in a stack against an aluminum alloy plate thinly smeared with a 1:4 toluene-ceresin wax solution applied warm, allowed to cool and then polished. This coating is an effective parting agent between the metal plate and the resins in the felts. The stack of felts was next covered on the exposed side with a venting layer consisting of two sheets of 0.007 inch thick glass cloth and a sheet of open copper wire gauze. The assembly of stack and venting layer was placed in a vacuum bag which was evacuated to a vacuum of 25 inches of mercury. The complete bag and enclosed assembly were placed in an oven and cured by heating for two hours at 100–110° C.

Example III

Eight asbestos felts impregnated with phenol-formaldehyde resin as in Example II were sprayed with the following mixture on both sides:

80 parts by weight stable water soluble resorcinol formaldehyde resin,
20 parts by weight industrial methylated spirit.

The spray gun used was an Aerograph type DCA with an air cap of No. 62 and a type A.C. nozzle for handling resin syrups of fairly high viscosity.

As in Example II, a minimum solvent evaporation time of 10 minutes was allowed. The original weight of the felts before the spraying operation was 80 grams per square foot and the final weight after spraying and evaporation was 110 grams per square foot.

The felts were assembled in a stack against an aluminium alloy plate and subsequently cured in a manner similar to that of Example II.

Example IV

Sixty samples of asbestos felt impregnated with a phenol formaldehyde resin as in Example III were further treated with a stable resorcinol-formaldehyde solution by spraying as in Example III after removing the impregnated felts from store and immediately prior to moulding. The samples were lightly damped on both sides (by means of a wet sponge) and manipulated by hand and hand rollers on to a complex shaped double conical mandrel having a double curvature surface. A venting layer was applied as in Example III to each of several assemblies of the samples on the moulds which were placed in a rubber bag and cured under vacuum as in Examples II and III.

It is to be noted that the samples where stored after impregnation with the stable resorcinol formaldehyde resin solution at room temperature for a minimum period of ten days before removal from store and moulding.

*Example V*

Referring to Figure 1, the mould employed had an internal cavity lined with a highly polished stainless steel sheet 10 enclosed by concrete 35 cast in a steel box or trough 22, layers 15, 17 and 19 of fibrous material impregnated with cured plastic material being provided between the metal lining and the concrete and electric resistance networks 16 and 18 being provided between the various layers. Reinforcing elements 23 were provided in the concrete.

In the production of the aerofoil skin, this inner (metallic) surface of the mould was first lined as at 24 with the appropriate thickness of several layers of asbestos felt impregnated with a solution of phenol formaldehyde resin in a proportion of approximately 50% by weight and subsequently, just before laying up in the mould, with a solution of a stable resorcinol-formaldehyde resin in acetone in proportions by weight of 9:1. The second impregnation was carried out by spraying as in Example III. A parting agent was applied to the mould before the laying up of the felts in the mould.

It is to be noted that if a single resinated asbestos sheet of sufficient size is not obtainable, great care will be required in obtaining smooth joints between the individual sheets; where several superposed sheets are required to obtain a lining of the requisite thickness, the joints between individual sheets should be staggered in the various laminations. Variation of the thickness of the lining, for example, to provide increased thickness of the finished skin in the root portion of the aerofoil, will be attained by varying the number of laminations.

A combined heating element and porous mat, comprising an electrical resistance network 25 enclosed between layers 26 and 27 of cellular material, for example glass fibre cloth, was next introduced and was followed by an airtight rubber bag 28. The free edges of the bag 28 and of the cellular layers 26 and 27 were led over angle members (indicated at 29 and 30) placed on top of the mould and were sealed by clamping them against the upper edges of the box 22 by means of bars (indicated at 31 and 32). Wedge-shaped portions of copper gauze (indicated at 33 and 34) were located in the angles of the angle members and were enclosed by the bag 28 and the layers 26 and 27, the air spaces in the copper gauze communicating with those in the porous mat (both where there is contact and also by way of holes 41 and 42 in the angle members) and also with a vacuum pump (not shown) by way of pipes 37 and 38 respectively.

The various parts having been positioned, the vacuum pump was started to suck air from the air spaces of the porous mat, with the result that the pressure of the atmospheric air in the space in the centre of the mould enclosed by the bag pressed the layer 24 of resinated asbestos against the metallic lining. Electric current was then applied to the resistance networks 16 and 18 by way of the leads 20 and 21 and to the network 25 by way of leads 39 and 40, with the result that the layer 24 was heated for the purpose of curing the resinous impregnate; the considerable volume of gases evolved during the curing process being removed by means of the vacuum pump.

When the curing process was complete, the parts 25, 26, 27 and 28 were removed and the finished skin 24 was withdrawn.

In a method carried out as just described, the withdrawal of the finished skin from the mould may be effected by springing it out of the mould and it is then a requirement that the shape of the internal cavity in the mould shall be such that the widest section of the skin will pass through the entrance to the cavity when the two free edges of the skin are in contact. When this is impossible, or springing out is otherwise impracticable, for instance, when a complete aerofoil skin rather than a substantially U-shaped section is to be produced, the direction of withdrawal will have to be different, for example, at right angles to the plane of the paper in the example illustrated in the drawings, and the mould will be constructed accordingly.

In the examples above described it will be noted that the proportions by weight of the monohydric phenol aldehyde resin and the polyhydroxy phenol aldehyde resin are approximately equal before curing takes place but it has been found quite satisfactory to use a proportion of the latter resin in the range 30 to 70% of the total weight of the resins. However, as will be apparent to those skilled in the art, greater proportions of the polyhydroxy phenol will correspondingly reduce the time and for temperature of cure of the mixed resin but be correspondingly more expensive while smaller proportions may not have a sufficiently beneficial effect to make their addition worth while.

It is to be noted that in ordinary commercial practice a temperature of 100° C., which is adequate for the working of the invention, is easily attainable in curing operations of the kind described in the examples, whereas at 150° C. the difficulties to be overcome are much greater, especially if the article or material being produced is such that the cure cycle necessitates working upwards from approximately room temperature on each occasion. Thus, in Example V, the frequency of use of a mould of the kind described may be doubled compared with existing moulding operations and the life of moulds may be considerably increased. In this respect moulds of cheap materials may be used such as plaster of Paris which will withstand 100° C. but begins to decompose at 120° C.

Solvents other than acetone which may be used in carrying out the invention are chloroform, carbon tetrachloride, diethyl ether, methyl alcohol, ethyl alcohol, ethyl acetate, methyl ethyl ketone, methylene dichloride and the like.

I claim:

1. A method of making a heat convertible synthetic resin mixture substantially stable at room temperature comprising mixing a thermo-setting monohydric phenol aldehyde resin with a polyhydroxy phenol aldehyde resin which is itself substantially stable at room temperature, the unreacted aldehyde content of said monohydric phenol aldehyde resin being insufficient for any resulting activation of said polyhydroxy phenol aldehyde resin to cause substantial curing of said mixture at room temperature, said mixture comprising 20–80% by weight of said polyhydroxy phenol aldehyde resin, at least one of the resin mixture curing factors of time and temperature being substantially reduced as compared with the cure factors of a heat convertible monohydric phenol aldehyde resin per se.

2. A method as claimed in claim 1 wherein said monohydric phenol aldehyde resin comprises phenol and formaldehyde in molecular proportions in the range 1:1–1:1.5 and said polyhydroxy phenol aldehyde resin comprises resorcinol and formaldehyde in molecular proportions in the range 1:0.5–1:0.8.

3. A method of making a synthetic resinous product consisting of a felted or woven fibrous component having a heat convertible synthetic resin mixture impregnated therethrough, said mixture being substantially stable at room temperature, comprising impregnating a component having a thermosetting monohydric phenol aldehyde resin dispersed therethrough with a polyhydroxy phenol aldehyde resin itself substantially stable at room temperature so as to form a mixture in the component, said monohydric phenol aldehyde resin having an unreacted aldehyde content insufficient for any resulting activation of the polyhydroxy phenol aldehyde resin to cause substantial curing of the mixture at room temperature, said mixture comprising 20–80% by weight of said polyhydroxy phenol aldehyde resin, at least one of the resin mixture curing factors of time and temperature being substantially reduced as compared with the cure factors of a heat convertible monohydric phenol aldehyde resin per se.

4. A method as claimed in claim 3 wherein said monohydric phenol aldehyde resin comprises phenol and formaldehyde in molecular proportions in the range 1:1–1:1.5 and said polyhydroxy phenol aldehyde resin comprises resorcinol and formaldehyde in molecular proportions in the range 1:0.5–1:0.8.

5. A method of producing a moulded synthetic resinous product consisting of a felt or woven fibrous component and a cured synthetic resin mixture impregnated therethrough, comprising the steps of impregnating a component having a monohydric phenol aldehyde resin dispersed therethrough, with a polyhydroxy phenol aldehyde resin stable at room temperature to form a mixed resin throughout said component, said monohydric resin having an unreacted aldehyde content insufficient for any resulting activation of said polyhydroxy phenol aldehyde resin to cause substantial curing of the resin mixture at room temperature, said mixture comprising 20–80% by weight of the polyhydroxy phenol aldehyde resin, positioning the mixture-impregnated component against a mould surface, covering the impregnated component with porous material, positioning in appropriate relation to said porous material an element non-permeable to air and capable of being pressed against said porous material by means of a pressure differential across said element, said mould surface and said element at least in part bounding a sealed chamber, exhausting said chamber to generate said pressure differential by suction through said porous material, the impregnated component being pressed against the mould surface, applying heat to said component to cure said mixture, and continuing the exhausting to maintain a differential pressure across the non-permeable element, thereby maintaining the component in contact with said mould surface and effecting continuous exhaustion through said porous material of gases evolved from the mixture during curing.

6. A method as claimed in claim 5 wherein said monohydric phenol aldehyde resin comprises phenol and formaldehyde in molecular proportions in the range 1:1–1:1.5 and said polyhydroxy phenol aldehyde resin comprises resorcinol and formaldehyde in molecular proportions in the range 1:0.5–1:0.8.

7. A method as claimed in claim 6 wherein heat is applied by electrical heating means situated between layers of porous material interposed between the resin impregnated component and the non-permeable sheet.

8. A heat convertible synthetic resin mixture substantially stable at room temperature, comprising a thermosetting monohydric phenol aldehyde resin with a polyhydroxy phenol aldehyde resin which is itself substantially stable at room temperature, the unreacted aldehyde content of said monohydric phenol aldehyde resin being insufficient for any resulting activation of said polyhydroxy phenol aldehyde resin to cause substantial curing of said mixture at room temperature, said mixture comprising 20–80% by weight of the polyhydroxy phenol aldehyde resin, at least one of the resin mixture curing factors of time and temperature being substantially reduced as compared with the cure factors of a heat convertible monohydric phenol aldehyde resin per se.

9. A synthetic resinous product consisting of a felted or woven fibrous component and a heat convertible synthetic resin mixture substantially stable at room temperature impregnated therethrough, said mixture comprising a thermosetting monohydric phenol aldehyde resin initially dispersed throughout the component and a subsequently impregnated polyhydroxy phenol aldehyde resin itself substantially stable at room temperature, said monohydric phenol aldehyde resin having an unreacted aldehyde content insufficient for any resulting activation of the polyhydroxy phenol aldehyde resin to cause substantial curing of the mixture at room temperature, said mixture comprising 20–80% by weight of said polyhydroxy phenol aldehyde resin, at least one of the resin mixture curing factors of time and temperature being substantially reduced as compared with the cure factors of a heat convertible monohydric phenol resin per se.

10. A synthetic resinous product consisting of a felted or woven fibrous component and a heat cured synthetic resin mixture impregnated therethrough, said mixture comprising a thermosetting monohydric phenol aldehyde resin initially dispersed throughout the component and a subsequently impregnated polyhydroxyl phenol aldehyde resin substantially stable at room temperature, said monohydric phenol aldehyde resin having an unreacted aldehyde content insufficient to cause substantial curing of the mixture at room temperatures, said mixture comprising 20–80% by weight of the polyhydroxy phenol aldehyde resin.

References Cited in the file of this patent

UNITED STATES PATENTS

| | | |
|---|---|---|
| 2,353,996 | Cooke et al. | July 18, 1944 |
| 2,385,373 | Rhodes | Sept. 25, 1945 |
| 2,422,979 | Pecker | June 24, 1947 |
| 2,480,851 | Goss | Sept. 6, 1949 |
| 2,513,274 | Barkhuff | July 4, 1950 |
| 2,524,079 | Rhodes | Oct. 3, 1950 |
| 2,527,581 | Searer et al. | Oct. 31, 1950 |
| 2,613,397 | Borkland | Oct. 14, 1952 |
| 2,626,942 | De Groote | Jan. 27, 1953 |
| 2,688,774 | Malinowski | Sept. 14, 1954 |
| 2,694,227 | Fordyce et al. | Nov. 16, 1954 |
| 2,698,260 | Meauze et al. | Dec. 28, 1954 |
| 2,728,741 | Simon et al. | Dec. 27, 1955 |
| 2,769,202 | Thompson | Nov. 6, 1956 |
| 2,769,740 | Gordon | Nov. 6, 1956 |
| 2,781,287 | Gustus et al. | Feb. 12, 1957 |
| 2,832,995 | McCaw | May 6, 1958 |